March 18, 1969 C. W. JACK 3,432,942

CONVERSION DEVICE

Filed April 13, 1967

INVENTOR.
CHARLES W. JACK
BY
Howard E. Thompson
ATTORNEY 3,432,942

CONVERSION DEVICE

Charles W. Jack, Old Chatham, N.Y., assignor to The Executive Line, Inc., Chatham, N.Y., a corporation of New York Filed Apr. 13, 1967, Ser. No. 630,607
U.S. Cl. 35—31 2 Claims
Int. Cl. G09b *19/00, 23/02;* G09f *11/04*

ABSTRACT OF THE DISCLOSURE

A conversion device for converting, for example, fractions to millimeters, wherein two relatively rotatable discs are employed, one disc having on one half of a surface thereof an arrangement of fractons in a plurality of radially spaced circumferential lines and on the other half of the surface an arrangement of millimeters in a plurality of circumferential lines, the other disc comprising a cover plate having a radial arrangement of apertures registering with the fractions of the first disc and a plurality of apertures arranged at substantially 45° to a radial line extending through the first apertures and registering with the millimeter characterizations of said first disc.

*Background of the invention*

The invention deals with a device comprising two relatively rotatable discs and with an angular arrangement of the millimeter characters on the one disc registering with angularly disposed apertures on the cover disc, whereby a relatively large number of the fractions and millimeters can be incorporated on a relatively small disc-like device, easily manipulated in the hand in completing any desired conversion of fractions to millimeters or vice versa.

While computer and educational devices have been developed, these devices have either had limitations or have been complicated in the structures thereof, as evidenced, for example, by the following United States patents: Witter et al. Pat. No. 2,591,327, issued Apr. 1, 1952; Day, Pat. No. 2,965,980, issued Dec. 27, 1960; McMahon, Pat. No. 2,989,811, issued June 27, 1961.

To applicant's knowledge, the angular arrangement of the characters as well as the apertures on the cover sheet, are believed to be distinctly new in this art.

*Summary of the invention*

With devices of the type and kind under consideration, various combinations of characterizations can be visualized in one series of apertures on a cover disc with a reference thereto or solution thereof visualized in another series of angularly disposed apertures in the same cover disc. With structures of the type and kind defined, solutions or conversions can be quickly and simply calculated in relative rotations of the two discs.

The novel features of the invention will be best understood from the following description, when taken together with the accompanying drawing, in which certain embodiments of the invention are disclosed and, in which, the separate parts are designated by suitable reference characters in each of the views and, in which.

Figure 1:
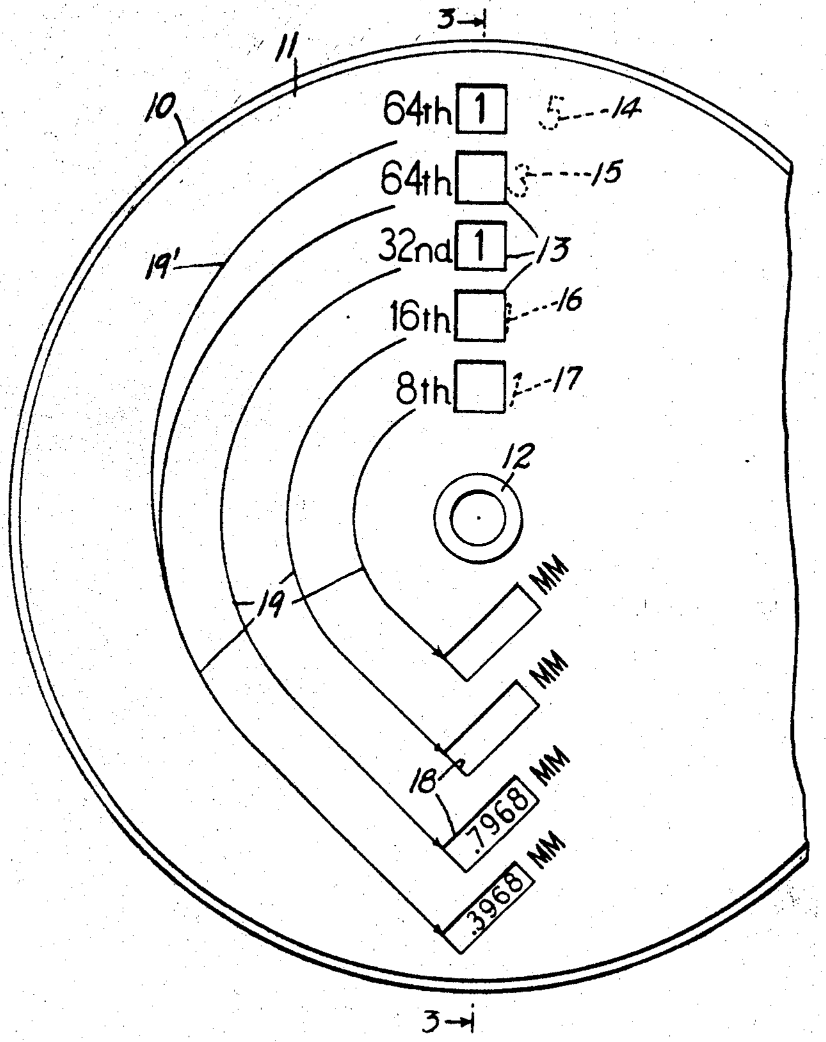
FIG. 1 is an enlarged diagrammatic plan view of a device made according to my invention, with part of the construction broken away.

In illustrating one adaptation and use of the invention, the device comprises a characterized disc 10 and what might be termed a top or cover disc 11, the discs being assembled by an eyelet or other coupling 12 to facilitate free relative rotation of the discs 10 and 11 one with respect to the other. The disc 10 is slightly larger in diameter than the disc 11 to facilitate free finger rotation of the disc 10 while the disc 11 is held stationary.

On the upper surface of the disc 10 will be arranged two groups of associated characterizations, one characterization occupying one half of the surface of the disc; whereas, the associated characterizations occupy the other half of the disc. In the present illustration, the one characterization can comprise a series of fraction numerals arranged in five circumferential rows for registration with five radially arranged apertures 13 in the disc 11. Associated with these five apertures in distinguishing one from the other are the characterizations "8th," "16," "32nd," "64th" and "64th." Registering with the "8th" aperture would be the numerals 1 to 7, inclusive; registering with the "16th" aperture would be the odd numerals 1, 3, 5 etc. to 15; registering with the "32nd" aperture are the odd numerals 1, 3, 5 etc. to 31; registering with the first "64th" aperture are the odd numerals 3, 7, 11 etc. to 63, and registering with the outer "64th" aperture will be the odd numerals 1, 5, 9 etc. to the numeral 61.

In the showing in FIG. 1 of the drawing, the numeral 1 on the last mentioned row of numerals is shown registering with the outer "64th" aperture. In this setting, the numeral 1 will also appear in the "32nd" aperture.

To illustrate at least, in part, positions of associated numerals in the different rows, the numeral 5 has been illustrated in dotted lines at 14 in the outer row of numerals. The numeral 3 on the next adjacent row of numerals is indicated in dotted lines at 15. The numeral 1 for registration with the "16th" aperture is indicated in dotted lines at 16 and the numeral 1 registering with the "8th" aperture is indicated in dotted lines at 17. This is done to give an idea as to the spacing and setting of the various rows of numerals with the respective apertures.

At 180° to the radial arrangement of apertures 13 is an arrangement of elongated apertures 18, the arrangement of which is substantially at 45° to a radial line extending through the apertures 13. In the setting of the discs, as shown in FIG. 1, with numerals 1 registering with the "32nd" aperture and the outer "64th" aperture, the conversion of these numerals will appear in millimeters in two of the apertures 18, as diagrammatically illustrated. The recording in the outermost aperture will be the lowest millimeter compution.

Figure 2:
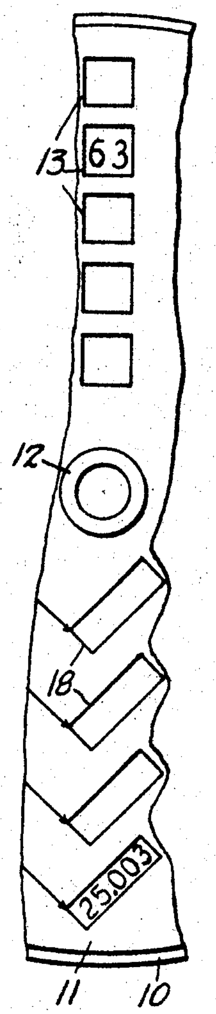
FIG. 2 is a segment portion of the edvice as shown in FIG. 1, with the discs in a different setting than the setting of the discs as shown in FIG. 1.
Figure 3:
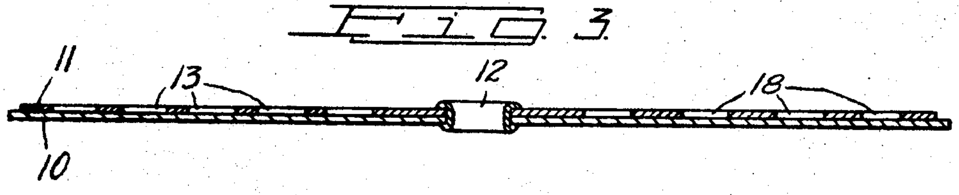
FIG. 3 is a section on the line 3—3 of FIG. 1.

Turning now to the brief showing in FIG. 2 of the drawing, here it will appear that the highest numeral characterization 63 is registering with the innermost "64th" aperture and the millimeter conversion is shown in the outermost aperture 18 and this would be the highest millimeter conversion on the disc 10.

By virtue of the 45° angular arrangement of the apertures 18 and the millimeter characterizations on the disc 10, a relatively large number of conversions can be employed on a relatively small disc. In actual practice, the disc 10 can be three and one-half inches in diameter; whereas, the disc 11 can be three and three-eighths of an inch in diameter, thus producing in the device a very small compact arrangement which can be not only easily handled but easily packaged, stored or carried.

The cover disc 11 also includes line markings 19 thereon associating the apertures 13 with respect to the apertures 18 to facilitate proper reading of the device and 19' represents a supplemental marking, placing both of the "64th" apertures in registration with the one elongated aperture 18, as diagrammatically shown.

In addition to conversion of fractions to millimeters, conversions can be made from fractions to decimals and, in fact, conversions of any two related subjects can be employed on the disc 10 and, in some instances, these discs can be made considerably larger than those herein defined, depending upon the shape and size of the two associated characterizations employed. In the present illustration, the two discs 10 and 11 can be formed of aluminum or aluminum alloys. However, in some uses, plastic or other materials can be employed.

Having fully described my invention, what I claim as new and desire to secure by Letters Patent is:

1. A conversion device comprising a pair of pivotally coupled relatively rotatable discs, one disc comprising a characterized disc having first and second groups of associated characterizations on a surface thereof, each group of characterizations occupying substantially one-half of said surface, said first group of characterizations being arranged in radial rows, said second group of characterizations being arranged at an acute angle to a radial line extending through said first named group, the other disc comprising a cover disc arranged upon said surface of the first disc, said cover disc having a radial arrangement of a plurality of spaced apertures registering with said first group of characterizations on the first disc, said cover disc also having, at substantially 180° to the first apertures, a plurality of elongated apertures arranged at the same angular relationship as said second group of characterizations, said elongated apertures registering with the second group of characterizations on said first disc, and one of said discs being greater in diameter than the other disc to facilitate rotation of said discs.

2. A device as defined in claim 1, wherein said cover disc has means associating the first named apertures with said elongated apertures to define proper reading between the characterizations of the first group with the characterizations of the second group.

References Cited

UNITED STATES PATENTS 1,536,693 5/1925 Schneider ------------- 40—70
3,231,189 1/1966 Barham ----------- 35—31 XR

FOREIGN PATENTS 923,979 4/1963 Great Britain.

JEROME SCHNALL, *Primary Examiner.*

U.S. Cl. X.R.

35—74; 40—70; 235—88